United States Patent
Sui et al.

(10) Patent No.: US 9,424,265 B1
(45) Date of Patent: Aug. 23, 2016

(54) METHOD AND SYSTEM FOR BACKING UP AND RESTORING A MULTI-USER RELATIONAL DATABASE MANAGEMENT SYSTEM

(71) Applicant: EMC Corporation, Hopkinton, MA (US)

(72) Inventors: Jiayuan Sui, Burlington (CA); Emile Lecoultre, Burlington (CA); Yasemin Ugur-Ozekinci, Oakville, CA (US)

(73) Assignee: EMC CORPORATION, Hopkinton, MA (US)

( * ) Notice: Subject to any disclaimer, the term of this patent is extended or adjusted under 35 U.S.C. 154(b) by 245 days.

(21) Appl. No.: 13/905,679

(22) Filed: May 30, 2013

(51) Int. Cl.
G06F 12/00 (2006.01)
G06F 17/30 (2006.01)

(52) U.S. Cl.
CPC .............. *G06F 17/30129* (2013.01)

(58) Field of Classification Search
CPC .......................... G06Q 30/0201; G06Q 50/01
USPC ....................................................... 707/828
See application file for complete search history.

(56) References Cited

U.S. PATENT DOCUMENTS

| | | | |
|---|---|---|---|
| 5,455,946 A * | 10/1995 | Mohan et al. | |
| 5,933,818 A * | 8/1999 | Kasravi et al. | 706/12 |
| 7,725,428 B1 * | 5/2010 | Hawkins et al. | |
| 2002/0133738 A1 * | 9/2002 | Zeigler | G06F 11/0796 714/6.12 |
| 2003/0105732 A1 * | 6/2003 | Kagalwala et al. | 707/1 |
| 2003/0163493 A1 * | 8/2003 | Burns et al. | 707/204 |
| 2008/0133622 A1 * | 6/2008 | Brown et al. | 707/204 |

OTHER PUBLICATIONS

BrightStor ARC serve Backup for Linux; 2006; Computer Associates; r11.5; 1-388.*

* cited by examiner

*Primary Examiner* — Taelor Kim
(74) *Attorney, Agent, or Firm* — Dergosits & Noah LLP; Todd A. Noah (57) ABSTRACT

Backing up and restoring a multi-user relational database management system is described. A first unique backup file name is created, based on a user-specified name, for a first backup file associated with a relational database management system that provides multi-user access to at least one database. A second unique backup file name is created, based on the user-specified name, for a second backup file associated with the relational database management system. A request is received to restore a database to a state associated with a point in time. The first backup file and the second backup file are recovered based on the point in time and the user-specified name. The first backup file and the second backup file are restored to the database.

20 Claims, 3 Drawing Sheets

METHOD AND SYSTEM FOR BACKING UP AND RESTORING A MULTI-USER RELATIONAL DATABASE MANAGEMENT SYSTEM

BACKGROUND

If a software error corrupts a database, or if erroneous data updates the database, a database administrator may restore the database to a previous uncorrupted state that does not include the corrupted or erroneous data. A backup application executes a backup operation occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore the database with a copy of the backup files corresponding to that state.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Many multi-user relational database management systems include a native backup tool, which can be used to backup and restore an associated database without using any third-party backup application. For example, MySQL® Enterprise Edition comes with a native backup tool, MySQL® Enterprise Backup that creates backup files which are referred to as backup images. However, native backup tools may be quite complicated to use. For example, when creating a backup file, a user needs to assign a unique backup file name to each backup file, even when the backup files are for the same set of data. The user is burdened with the responsibility of manually managing the backup file names and keeping track of all of the backup files.

Each backup file has a log sequence number. To perform an incremental backup, a user needs to provide the log sequence number of a previous backup (either full or incremental) which serves as a base, and thus the user needs to manually keep track of the log sequence number for each backup file. If a user loses the log sequence number for a backup file, then no incremental backup can be performed based on the corresponding incremental backup file.

Many native backup tools lack a built-in transaction log backup and restore mechanism. Transaction logs need to be processed to recover a database to a specified point-in-time. Transaction log processing may be tedious to carry out, and may involve the manual steps of generating a temporary file containing all transactions after the last backup restored to the database, manually pruning unwanted transactions from the temporary file (in case of a point-in-time restore), and replaying transactions in this temporary file to the database. In order for the processing of transaction logs to be successful, the user needs to manually keep track of the start position of each backup file to inform the native backup tool of the starting point of the transactions to be generated into the temporary file.

When a database needs to be restored, a user needs to determine which backup files need to be used in order to perform the desired database restore, which can be a time consuming, complicated, unintuitive, and error-prone process. To restore a backup file to a database involves the manual steps of extracting the backup file to a staging area, preparing the backup file by applying log information and incremental backup files, and copying back the prepared backup file to the database directory, with each of these steps requiring a number of different parameters. Therefore, just performing a simple restore may be quite laborious.

Embodiments herein enable backing up and restoring a multi-user relational database management system. A first unique backup file name is created, based on a user-specified name, for a first backup file associated with a relational database management system that provides multi-user access to at least one database. For example, a backup application creates the first unique backup file name "foo_full_whole_1302094812," based on the user-specified name of "foo," the backup type of "full," the backup scope of "whole," and the timestamp of "1322094812," for a full backup file. A second unique backup file name is created, based on the same user-specified name, for a second backup file associated with the relational database management system. For example, the backup application creates the second unique backup file name "foo_differential_partial_1302194812," based on the user-specified name of "foo," the backup type of "differential," the backup scope of "partial," and the timestamp of "1302194812," for a differential incremental backup file.

A request is received to restore a database to a state associated with a point in time. For example, the backup application receives a request to restore the database associated with the user-specified name "foo" to a point in time after the creation of the full backup file and the differential incremental backup file. The first backup file and the second backup file are recovered based on the point in time and the user-specified name. For example, the backup application recovers both the full backup file and the differential incremental backup file because both files begin with the user-specified name "foo" and because both files were created before the specified point in time. The first backup file and the second backup file are restored to the database. For example, the backup application restores the full backup file and the differential incremental backup file to the corrupted database.

The backup application is much easier and simpler to use than the native backup tool, as a user can keep track of all associated backups with just one user-specified name. The user does not need to bother with coming up with a unique backup file name for each and every backup file and manually keep track of these names and files. For a database restore, the user provides the backup application with the user-specified name, and the backup application determines which backup files are needed, and restores these backup files to the database.

Figure 1:
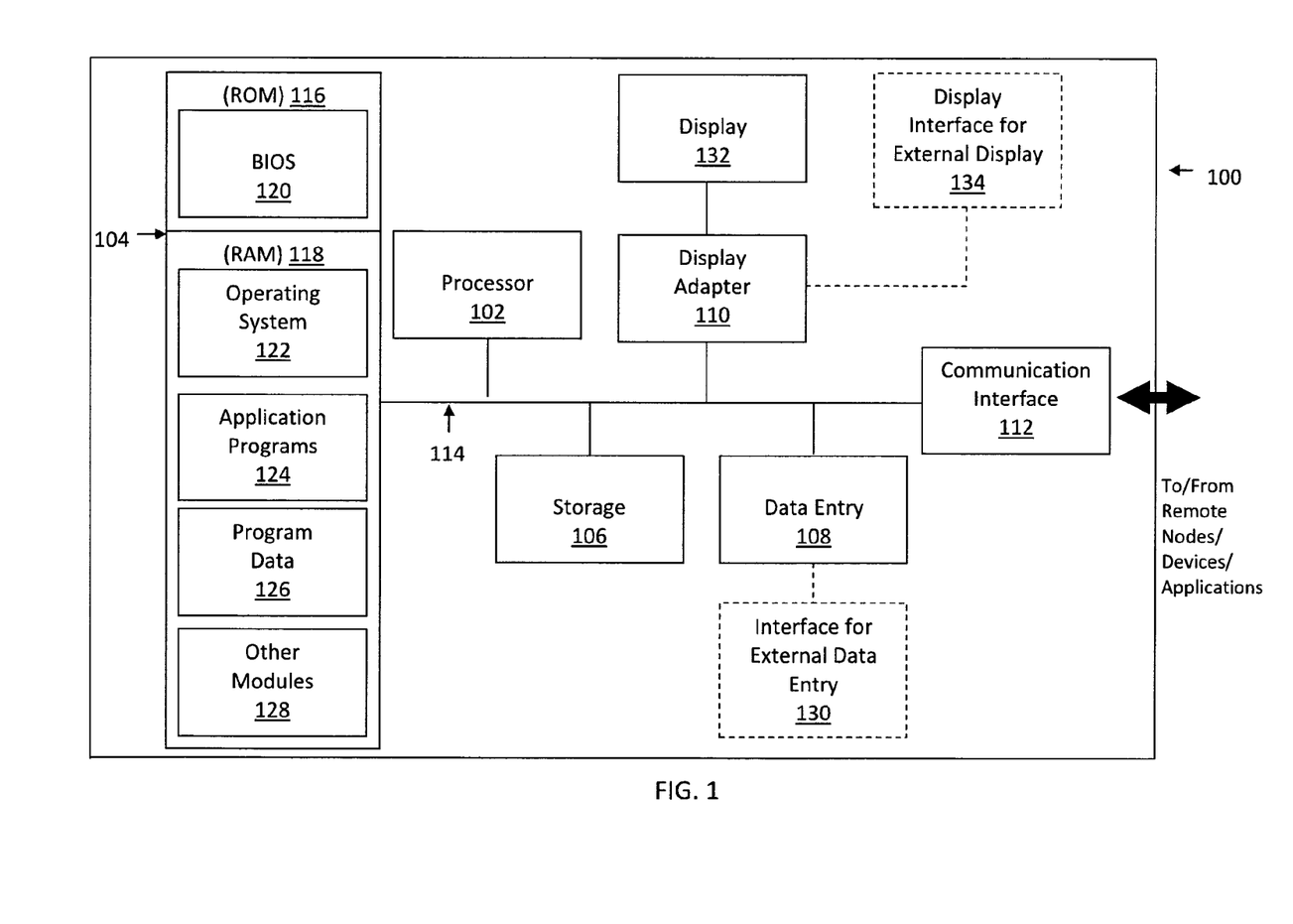
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG.

1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for backing up and restoring a multi-user relational database management system.

Prior art native backup tools may be quite complicated to use, as a user is burdened with the responsibility of manually managing the backup file names and keeping track of all of the backup files. When a database needs to be restored, a user needs to determine which backup files need to be used in order to perform the desired database restore, which can be a time consuming, complicated, unintuitive, and error-prone process that involves many manual steps, with each of these steps requiring a number of different parameters. Embodiments herein enable backing up and restoring a multi-user relational database management system. The backup application is much easier and simpler to use than the native backup tool, as a user can keep track of all associated backups with just one user-specified name. The user does not need to bother with coming up with a unique backup file name for each and every backup file and manually keep track of these names and files. For a database restore, the user provides the backup application with the user-specified name, and the backup application determines which backup files are needed, and restores these backup files to the database.

Figure 2:
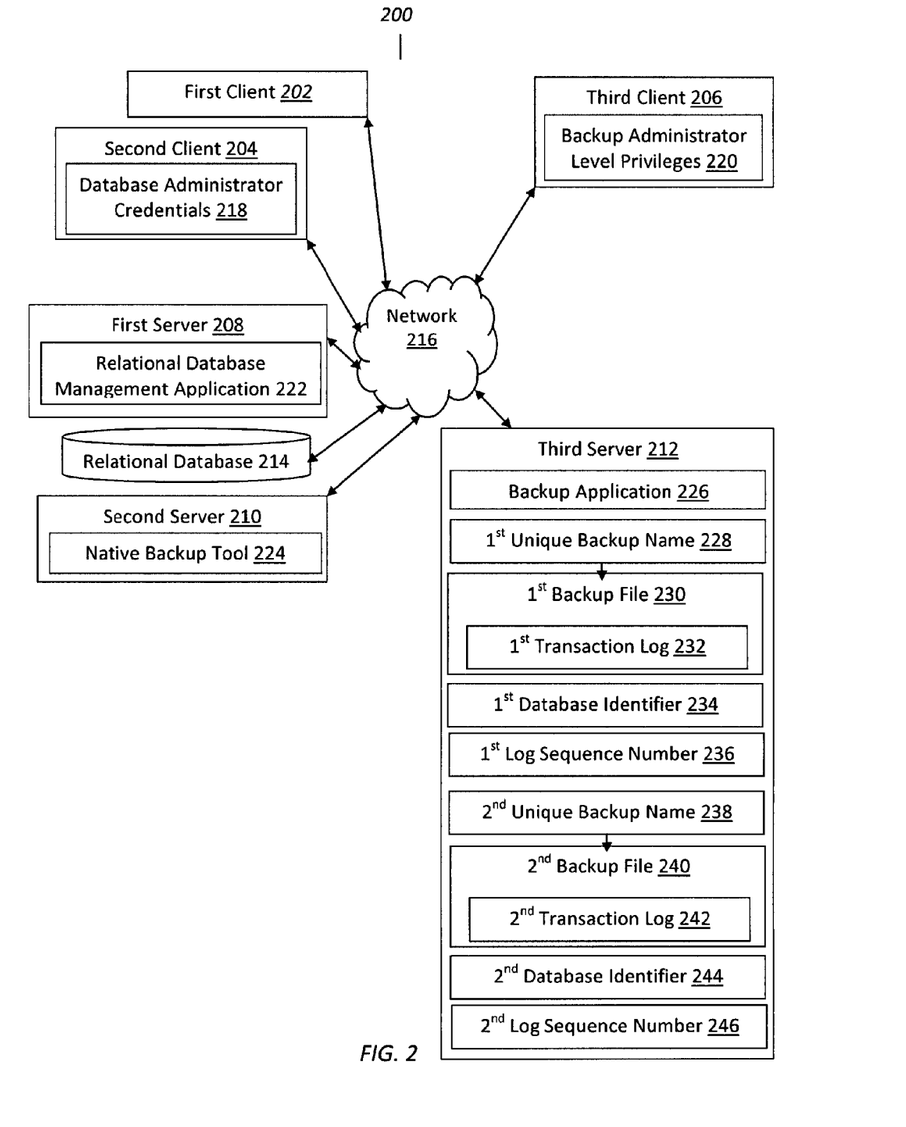
FIG. 2 illustrates a block diagram of an example system for backing up and restoring a multi-user relational database management system, under an embodiment.

FIG. 2 illustrates a block diagram of a system that enables backing up and restoring a multi-user relational database management system, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, and a third server 212, that are provided by a hosting company. The first server 208 is associated with a relational database 214. The clients 202-206, the servers 208-212, and the relational database 214 communicate via a network 216. Although FIG. 2 depicts the system 200 with three clients 202-206, three servers 208-212, one relational database 214, and one network 216, the system 200 may include any number of clients 202-206, servers 208-212, relational databases 214, and networks 216. The clients 202-206 and the servers 208-212 may each be substantially similar to the system 100 depicted in FIG. 1.

The first client 202 enables a user to access a relation database management system as a system user. The second client 204 includes database administrator credentials 218 that enable a user to access the relation database management system as a database administrator. The third client 206 includes backup administrator level privileges 220 that enable a user to access a third-party backup application as a backup administrator. The first server 208 includes a relational database management application 222 that executes to implement the relation database management system. The second server 210 includes a native backup tool 224 that manages backup and recovery for the relational database 214. The third server 212 includes a backup application 226, such as a NetWorker® backup application.

EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including UNIX, Linux, Microsoft Windows®, etc. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as the Oracle Relational Database Management System. Client backup data can be sent to a remote NetWorker® storage node or stored on a locally attached device by the use of a dedicated storage node.

The third server 212 also includes a first unique backup name 228, a first backup file 230 that includes a first transaction log 232, a first database identifier 234, a first log sequence number 236, a second unique backup name 238, a second backup file 240 that includes a second transaction log 242, a second database identifier 244, and a second log sequence number 246. Although the system 200 includes a first set of system elements 228-236 for the first backup file 230 and a second set of system elements 228-236 for the second backup file 240, the system 200 may include any number of similar sets of system elements for a corresponding number of backup files. FIG. 2 depicts the system elements 226-246 residing completely on the third server 212. However, the system elements 226-246 may reside in any combination of partially on the third server 212 and partially on other servers that are not depicted in FIG. 2.

The backup application 226 may store the first backup file 230 and/or the second backup file 240 on a destination node, which may be internal or external to the relational database management system. The backup files 230 and 240 may be image copies of data files or proprietary format files that include parts or all of multiple data files. For example, the backup application 226 stores the backup files 230 and 240 on a disk associated with the third server 212, thereby protecting the relational database 214 even if the relational database 214 is corrupted. The destination node, such as the third server 212, may include multiple destination nodes, and the multiple destination nodes may include a disk destination node, a tape destination node, and/or a destination node that is a combination of disks and tapes. For example, the backup application 226 may store the backup files 230 and 240 on a disk, on a tape, or partly on a disk and partly on a tape associated with the third server 212. A backup administrator may access the backup application 226 via the third client 206 to specify a priority for storing the backup files 230 and 240 on the destination nodes, such as storing only on disks, or storing on disks before storing on a combination of disks and tapes. Additionally, a backup administrator may use the backup application 226 to specify the options for the backup files 230 and 240 to be encrypted, deduplicated, and/or compressed while being transmitted from a source, and the options for the backup files 230 and 240 to be decrypted and/or decompressed when stored on an external destination node. Data deduplication significantly reduces cloning time by only storing unique daily changes, while always maintaining daily clone copies of full backup files for an immediate single-step restore. The transmission of deduplicated clone copies sends only changed blocks, thereby reducing network traffic.

The backup application 226 creates unique backup file names 228 and 238, based on a user-specified name, for the backup files 230 and 240 associated with a relational database management system that provides multi-user access to at least one database. For example, the backup application 226 creates the first unique backup file name 228: "foo_full_w-hole_1302094812," based on the user-specified name of "foo," the backup type of "full," the backup scope of "whole" and the timestamp of "1322094812," for the full backup file 230. In another example, the backup application 226 creates the second unique backup file name 238: "foo_differential_partial_1302194812," based on the user-specified name of "foo," the backup type of "differential," the backup scope of "partial" and the timestamp of "1302194812," for the differential incremental backup file 240. The backup application 226 liberates the user from having to create a unique backup file name for each and every backup file, as required by the native backup tool 224. The user only specifies a logical name for the data set he wants to backup, and then the backup application 226 creates a unique backup file name using the user-specified logical name. The timestamp portion of the unique backup file name is provided internally by the backup application 226, which corresponds to the time that the backup file is created. The backup application 226 enables the user to easily track all of the backup files for the same set of data using one logical name.

The backup files 230 and 240 may include the transaction logs 232 and 242, respectively. The backup application 226 may store the transaction logs 232 and 242 in the backup files 230 and 240 to backup transaction logs, either with or without data backup.

The backup files 230 and 240 may be associated with the database identifiers 234 and 244, respectively, that identify the origin of their backup data. During restore, the backup application 226 retrieves the database identifiers 234 and 244 to restore the backup data to its original place without asking the user to provide so. The user can override this feature by providing a different place to which the backup data should be restored.

The backup files 230 and 240 may be associated with the log sequence numbers 236 and 246, respectively, which may be 64 bit integers. The backup application 226 extracts the log sequence numbers 236 and 246 from the metadata files created by the database server during the creation of the backup files 230 and 240, respectively, and automatically keeps track of the log sequence number for each backup file. In contrast, the native backup tool 224 may require the user to manually keep track of the log sequence number for each backup file. Therefore, the backup application 226 does not require the user to provide a log sequence number for an incremental backup.

The second backup file 240 may be a cumulative incremental backup file instead of a differential incremental backup file. The backup application 226 provides two types of incremental backups, differential and cumulative. The backup application 226 automatically determines which log sequence number to use for which type of incremental backup. A differential incremental backup is based on the immediate previous backup, whereas a cumulative incremental backup is based on the immediate previous full backup. The backup application 226 keeps track of the log sequence number for each and every backup file. For a differential incremental backup, the backup application 226 uses the log sequence number of the immediate previous backup. For a cumulative incremental backup, the backup application 226 uses the log sequence number of the immediate previous full backup.

The backup application 226 receives a request to restore the relational database 214 to a state associated with a point in time. For example, the backup application 226 receives a request to restore the relational database 214 associated with the user-specified name "foo" to a point in time after the creation of the full backup file 230 and the differential incremental backup file 240.

The backup application 226 recovers the first backup file 230 and the second backup file 240 based on the point in time and the user-specified name. For example, the backup application 226 recovers both the full backup file 230 and the differential incremental backup file 240 because both of the backup files 230 and 240 begin with the user-specified name "foo" and because both of the backup files 230 and 240 were created before the specified point in time. The backup application 226 may recover the first backup file 230 and the second backup file 240 based on the first log sequence number 236 and the second log sequence number 246 associated with the first backup file 230 and the second backup file 240, respectively. The backup application 226 automatically determines the full backup and all necessary accompanying incremental backups needed to restore the relational database 214 to the specified point-in-time because the backup application 226 keeps track of the backup file names, backup types (full or incremental), backup creation times, and other metadata information for each and every backup file. If multiple backup files are needed in order to restore the relational database 214 to the specified point-in-time, the backup application 226 may recover and restore all of the required backup files in one single operation.

The backup application 226 may recover the first backup file 230 and the second backup file 240 to a staging area as two sets of data files, with the one being a full database backup, and the other an incremental backup, apply log information to the full backup file 230, and then apply the incremental backup file 240 to the full backup file 230 to create a prepared full backup file for restoring to the relational database 214, as one single operation. That is, a user only issues one operation, and the backup application 226 performs all these operations in the correct order with the correct parameters.

The backup application 226 restores the first backup file and the second backup file to the relational database 214. For example, the backup application 226 restores both of the backup files 230 and 240 to the corrupted relational database 214. If the transaction logs 232 and 242 are required to restore the relational database 214, the backup application 226 may process the transaction logs 232 and 242 integral to the database restore operation. In contrast, the native backup tool 224 may require a user to process any transaction logs separately from the database restore operation. The user does not need to provide the start-position for transaction log processing because the backup application 226 obtains the start-position from the metadata information created during the creation of the backup files 230 and 240, and saves the start position for each of the backup files 230 and 240. During transaction log processing, the backup application 226 internally provides the one corresponding to the last backup restored. In contrast to the native backup tool 224, which may require the user to manually prune the temporary transaction file generated from transaction log processing, the backup application 226 automatically prunes the temporary transaction file based on the point-in-time specified by the user. More specifically, the backup application 226 prunes the temporary transaction file, opens the temporary transaction file, and removes all transactions that are created after the point-in-time specified by the user. The user may restore all of the backed up transaction logs or just a range of the backed up transaction logs.

The backup application 226 may enable a user to schedule creation of the first backup file 230 and the second backup file 240. For example, the backup application 226 may create the second backup file 240 on an hourly basis and create the first backup file 230 on a daily basis. In contrast, the native backup tool 224 may not include a built-in scheduling mechanism. The backup application 226 may create the first backup file 230 based on a pre-defined first condition and create the second backup file 240 based on a pre-defined second condition. For example, the backup application 226 creates the second backup file 240 when a relatively small amount of data, but a sufficient amount to warrant an incremental backup, is updated to the relational database 214, and create the first backup file 230 when a relatively large amount of data, a sufficient amount to warrant a full backup, is updated to the relational database 214.

The backup application 232 is much easier and simpler to use than the native backup tool 224, as a user can keep track of all associated backups, such as the backup files 230 and 240, with just one user-specified name, such as "foo." The user does not need to bother with coming up with a unique backup file name for each and every backup file and manually keep track of these names and files. For a database restore, the user only needs to provide the backup application 226 with the user-specified name, such as "foo," and the backup application 232 determines which backup files are needed, such as the backup files 230 and 240, and restores these backup files 230 and 240 to the relational database 214.

Figure 3:
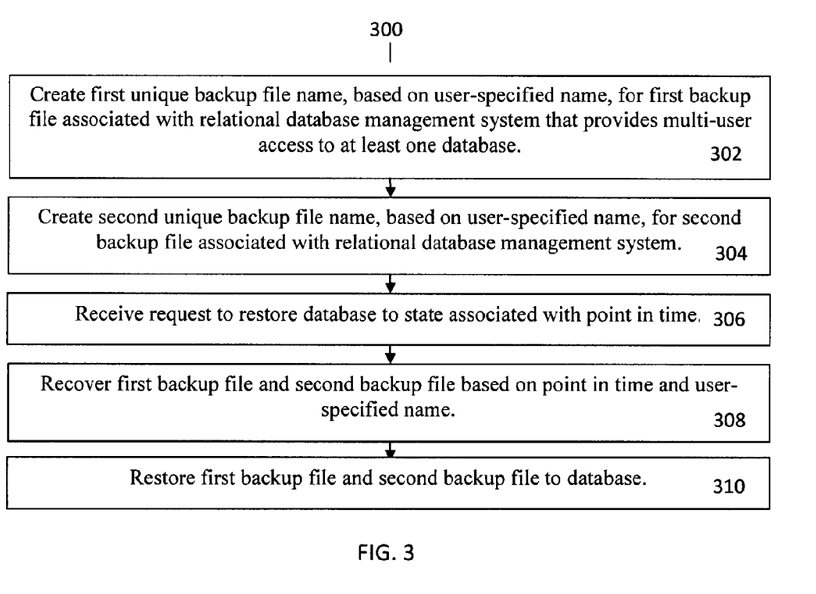
FIG. 3 is a flowchart that illustrates a method of backing up and restoring a multi-user relational database management system, under an embodiment.

FIG. 3 is a flowchart that illustrates a method of backing up and restoring multi-user relational database management systems. Flowchart 300 illustrates method acts illustrated as flowchart blocks for certain steps involved in and/or between the clients 202-206 and/or the servers 208-212 of FIG. 2.

A first unique backup file name is created, based on a user-specified name, for a first backup file associated with a relational database management system that provides multi-user access to at least one database, act 302. For example, the backup application 226 creates the first unique backup file name 228: "foo_full_whole_1302094812," based on the user-specified name of "foo," the backup type of "full," the backup scope of "whole," and the timestamp of "1322094812," for the full backup file 230.

A second unique backup file name is created, based on the user-specified name, for a second backup file associated with the relational database management system, act 304. For example, the backup application 226 creates the second unique backup file name 238: "foo_differential_partial_1302194812," based on the user-specified name of "foo," the backup type of "differential," the backup scope of "partial," and the timestamp of "1302194812," for the differential incremental backup file 240.

A request is received to restore a database to a state associated with a point in time, act 306. For example, the backup application 226 receives a request to restore the relational database 214 associated with the user-specified name "foo" to a point in time after the creation of the backup files 230 and 240.

A first backup file and a second backup file are recovered based on a point in time and a user-specified name, act 308. For example, the backup application 226 recovers both the full backup file 230 and the differential incremental backup file 240 because both of these files 230 and 240 begin with the user-specified name "foo" and because both of these files 230 and 240 were created before the specified point in time.

A first backup file and a second backup file are restored to a database, act 310. For example, the backup application 226 restores the full backup file 230 and the differential incremental backup file 240 to the corrupted relational database 214.

Although FIG. 3 depicts the acts 302-310 occurring in a specific order, the acts 302-310 may occur in another order. Executing the flowchart 300 enables backing up and restoring multi-user relational database management systems. The backup application 232 is much easier and simpler to use than the native backup tool 224, as a user can keep track of all associated backups, such as the backup files 230 and 240, with just one user-specified name, such as "foo." The user does not need to bother with coming up with a unique backup file name for each and every backup file and manually keep track of these names and files. For a database restore, the user provides the backup application 226 with the user-specified name, such as "foo," and the backup application 232 determines which backup files are needed, such as the backup files 230 and 240, and restores these backup files 230 and 240 to the relational database 214.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for backing up and restoring a multi-user relational database management system, the system comprising:
    a processor-based application executed on a computer and configured to:
        create a first unique backup file name, based on a user-specified name, for a first backup file associated with a relational database management system that provides multi-user access to at least one database, the first unique backup file name being created with the user-specified name and associated information identifying a backup type, a backup scope, and a backup time;
        create a second unique backup file name, based on the user-specified name, for a second backup file associated with the relational database management system, the second unique backup file name being created with the user-specified name and associated information identifying the backup type, the backup scope, and the backup time;
        receive a request to restore a database to a state associated with a point in time after the creation of the first backup file and the second backup file;
        recover the first backup file and the second backup file based on the requested point in time and the user-specified name, the user-specified name being used to identify the first unique backup file name and the second unique backup file name and the backup types, the backup scopes and the backup times associated with the user-specified name in the first and second unique backup file names; and
        restore the first backup file and the second backup file to the database.

2. The system of claim 1, wherein at least one of the first backup file and the second backup file further comprises a corresponding transaction log.

3. The system of claim 1, wherein at least one of the first backup file and the second backup file identifies the database.

4. The system of claim 1, wherein the first backup file is associated with a first log sequence number, the second backup file is associated with a second log sequence number; and recovering the first backup file and the second backup file comprises recovering the first backup file and the second backup file based on the first log sequence number and the second log sequence number.

5. The system of claim 1, wherein recovering the first backup file and the second backup file comprises recovering the first backup file and the second backup file to a staging area as a full database backup and an incremental database backup, applying log information to the full database backup and applying the incremental database backup to the applied full database backup to create a prepared full backup, and wherein restoring the first backup file and the second backup file to the database comprises restoring the prepared full backup to the database.

6. The system of claim 1, wherein restoring the first backup file and the second backup file to the database comprises restoring at least one of a full backup file, a cumulative incremental backup file, and a differential incremental backup file.

7. The system of claim 1, wherein the processor-based application is further configured to:
    enable a user to schedule creation of the first backup file and the second backup file, or
    create the first backup file based on a pre-defined first condition and create the second backup file based on a pre-defined second condition.

8. A computer-implemented method for backing up and restoring a multi-user relational database management system, the method comprising:
    creating a first unique backup file name, based on a user-specified name, for a first backup file associated with a relational database management system that provides multi-user access to at least one database, the first unique backup file name being created with the user-specified name and associated information identifying a backup type, a backup scope, and a backup time;
    creating a second unique backup file name, based on the user-specified name, for a second backup file associated with the relational database management system, the second unique backup file name being created with the user-specified name and associated information identifying the backup type, the backup scope, and the backup time;
    receiving a request to restore a database to a state associated with a point in time after the creation of the first backup file and the second backup file;
    recovering the first backup file and the second backup file based on the requested point in time and the user-specified name, the user-specified name being used to identify the first unique backup file name and the second unique backup file name and the backup types, the backup scopes and the backup times associated with the user-specified name in the first and second unique backup file names; and restoring the first backup file and the second backup file to the database.

9. The method of claim 8, wherein at least one of the first backup file and the second backup file further comprises a transaction log.

10. The method of claim 8, wherein at least one of the first backup file and the second backup file further identifies the database.

11. The method of claim 8, wherein the first backup file is associated with a first log sequence number, the second backup file is associated with a second log sequence number; and recovering the first backup file and the second backup file based on the point in time and the unique backup file name comprises recovering the first backup file and the second backup file based on the first log sequence number and the second log sequence number.

12. The method of claim 8, wherein recovering the first backup file and the second backup file comprises recovering the first backup file and the second backup file to a staging area as a full database backup and an incremental database backup, applying log information to the full database backup and applying the incremental database backup to the applied full database backup to create a prepared full backup, and wherein restoring the first backup file and the second backup file to the database comprises restoring the prepared full backup to the database.

13. The method of claim 8, wherein restoring the first backup file and the second backup file to the database comprises restoring at least one of a full backup file, a cumulative incremental backup file, and a differential incremental backup file.

14. The method of claim 8, wherein the method further comprises one of:
  enabling a user to schedule creation of the first backup file and the second backup file; or
  creating the first backup file based on a pre-defined first condition and creating the second backup file based on a pre-defined second condition.

15. A computer program product, comprising a non-transitory computer-readable medium having a computer-readable program code embodied therein, the computer-readable program code adapted to be executed by one or more processors to implement a method for backing up and restoring a multi-user relational database management system, the method comprising:
  creating a first unique backup file name, based on a user-specified name, for a first backup file associated with a relational database management system that provides multi-user access to at least one database, the first unique backup file name being created with the user-specified name and associated information identifying a backup type, a backup scope, and a backup time;
  creating a second unique backup file name, based on the user-specified name, for a second backup file associated with the relational database management system, the second unique backup file name being created with the user-specified name and associated information identifying the backup type, the backup scope, and the backup time;
  receiving a request to restore a database to a state associated with a point in time after the creation of the first backup file and the second backup file;
  recovering the first backup file and the second backup file based on the requested point in time and the user-specified name, the user-specified name being used to identify the first unique backup file name and the second unique backup file name and the backup types, the backup scopes and the backup times associated with the user-specified name in the first and second unique backup file names; and
  restoring the first backup file and the second backup file to the database.

16. The computer program product of claim 15, wherein at least one of the first backup file and the second backup file further comprises a transaction log.

17. The computer program product of claim 15, wherein at least one of the first backup file and the second backup file further identifies the database.

18. The computer program product of claim 15, wherein the first backup file is associated with a first log sequence number, the second backup file is associated with a second log sequence number; and recovering the first backup file and the second backup file based on the point in time and the unique backup file name comprises recovering the first backup file and the second backup file based on the first log sequence number and the second log sequence number.

19. The computer program product of claim 15, wherein recovering the first backup file and the second backup file comprises recovering the first backup file and the second backup file to a staging area as a full database backup and an incremental database backup, applying log information to the full database backup and applying the incremental database backup to the applied full database backup to create a prepared full backup, and wherein restoring the first backup file and the second backup file to the database comprises restoring the prepared full backup to the database.

20. The computer program product of claim 15, wherein restoring the first backup file and the second backup file to the database comprises restoring at least one of a full backup file, a cumulative incremental backup file, and a differential incremental backup file.

* * * * *